(12) United States Patent
Fletcher et al.

(10) Patent No.: US 10,244,084 B2
(45) Date of Patent: *Mar. 26, 2019

(54) REDUCING TCP CONNECTION ESTABLISHMENT TIME IN AN OVERLAY NETWORK

(71) Applicant: Akamai Technologies, Inc., Cambridge, MA (US)

(72) Inventors: Gregory Fletcher, Boston, MA (US); Kevin Harmon, Cambridge, MA (US); Brandon Williams, Revere, MA (US); William Sears, Lexington, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 635 days.

This patent is subject to a terminal disclaimer.

(21) Appl. No.: 14/852,644

(22) Filed: Sep. 14, 2015

(65) Prior Publication Data

US 2015/0381771 A1 Dec. 31, 2015

Related U.S. Application Data

(63) Continuation of application No. 13/941,962, filed on Jul. 15, 2013, now Pat. No. 9,137,339, which is a continuation of application No. 11/964,140, filed on Dec. 26, 2007, now Pat. No. 8,489,670.

(60) Provisional application No. 60/877,195, filed on Dec. 26, 2006.

(51) Int. Cl.
*H04L 29/06* (2006.01)
*H04L 12/24* (2006.01)
*H04L 12/66* (2006.01)
*H04L 29/08* (2006.01)

(52) U.S. Cl.
CPC ............ *H04L 69/161* (2013.01); *H04L 12/66* (2013.01); *H04L 41/00* (2013.01); *H04L 67/141* (2013.01); *H04L 67/42* (2013.01); *H04L 69/16* (2013.01)

(58) Field of Classification Search
CPC ................................................. H04L 69/161
See application file for complete search history.

(56) References Cited

U.S. PATENT DOCUMENTS

2003/0174648 A1 * 9/2003 Wang .................. H04L 65/1013
370/235

* cited by examiner

*Primary Examiner* — Esther B. Henderson
(74) *Attorney, Agent, or Firm* — David H. Judson (57) ABSTRACT

Applications that run on an overlay network-based managed service achieve high performance gains using a set of TCP optimizations. In a first optimization, a typical single TCP connection between a client and an origin server is broken into preferably three (3) separate TCP connections. These connections are: an edge-to-client connection, an edge-to-edge connection, and edge-to-origin connection. A second optimization replicates TCP state along the connection to increase fault tolerance. In this approach, preferably a given TCP connection is maintained on two servers. When a packet is received by one server, called the primary, its state is updated and then passed to a second server, called the backup. Only when the backup sends an acknowledgement back to the primary can it then send a TCP acknowledgement back to the host that originally sent the packet. Another optimization reduces connection establishment latency.

8 Claims, 11 Drawing Sheets

| STEP | CLIENT | E EndHost | E SRIP | G OIP | G Endhost | SERVER |
|---|---|---|---|---|---|---|
| 0 | CLOSED | CLOSED | CLOSED | CLOSED | CLOSED | CLOSED |
| 1 | SYN_SENT | SYN_RCVD* | SYN_SENT | CLOSED | CLOSED | CLOSED |
| 5 | SYN_SENT | SYN_RCVD* | ESTABLISHED* | CLOSED | CLOSED | CLOSED |
| 6 | ESTABLISHED | ESTABLISHED | ESTABLISHED* | CLOSED | CLOSED | CLOSED |
| 7 | ESTABLISHED | ESTABLISHED | ESTABLISHED* | SYN_RCVD | CLOSED | CLOSED |
| 10 | ESTABLISHED | ESTABLISHED | ESTABLISHED* | SYN_RCVD | SYN_SENT | SYN_RCVD |
| 11 | ESTABLISHED | ESTABLISHED | ESTABLISHED* | ESTABLISHED | SYN_SENT | SYN_RCVD |
| 12 | ESTABLISHED | ESTABLISHED | ESTABLISHED* | ESTABLISHED | ESTABLISHED | ESTABLISHED |
| 13 | ESTABLISHED | ESTABLISHED | ESTABLISHED | ESTABLISHED | ESTABLISHED | ESTABLISHED |

| STEP | CLIENT | E EndHost | E SRIP | G OIP | G Endhost | SERVER |
|---|---|---|---|---|---|---|
| 0 | ESTABLISHED | ESTABLISHED | ESTABLISHED | ESTABLISHED | ESTABLISHED | ESTABLISHED |
| 1 | FIN_WAIT1 | CLOSE_WAIT | FIN_WAIT1 | ESTABLISHED | ESTABLISHED | ESTABLISHED |
| 5 | FIN_WAIT2 | CLOSE_WAIT | FIN_WAIT1 | ESTABLISHED | ESTABLISHED | ESTABLISHED |
| 6 | FIN_WAIT2 | CLOSE_WAIT | FIN_WAIT1 | CLOSE_WAIT | FIN_WAIT1 | ESTABLISHED |
| 9 | FIN_WAIT2 | CLOSE_WAIT | FIN_WAIT1 | CLOSE_WAIT | FIN_WAIT1 | CLOSE_WAIT |
| 11 | FIN_WAIT2 | CLOSE_WAIT | FIN_WAIT1 | LAST_ACK | TIME_WAIT | LAST_ACK |
| 14 | FIN_WAIT2 | CLOSE_WAIT | FIN_WAIT1 | LAST_ACK | TIME_WAIT | CLOSED |
| 16 | FIN_WAIT2 | LAST_ACK | TIME_WAIT | LAST_ACK | TIME_WAIT | CLOSED |
| 21 | TIME_WAIT | LAST_ACK | TIME_WAIT | LAST_ACK | TIME_WAIT | CLOSED |
| 22 | TIME_WAIT | CLOSED | TIME_WAIT | CLOSED | TIME_WAIT | CLOSED |
| 23 | CLOSED | CLOSED | CLOSED | CLOSED | CLOSED | CLOSED |

*FIG. 8*

| STEP | CLIENT | E EndHost | E SRIP | G OIP | G Endhost | SERVER |
|---|---|---|---|---|---|---|
| 0 | ESTABLISHED | ESTABLISHED | ESTABLISHED | ESTABLISHED | ESTABLISHED | ESTABLISHED |
| 1 | CLOSED | CLOSED | CLOSED | ESTABLISHED | ESTABLISHED | ESTABLISHED |
| 4 | CLOSED | CLOSED | CLOSED | CLOSED | CLOSED | ESTABLISHED |
| 5 | CLOSED | CLOSED | CLOSED | CLOSED | CLOSED | CLOSED |

REDUCING TCP CONNECTION ESTABLISHMENT TIME IN AN OVERLAY NETWORK

BACKGROUND OF THE INVENTION

It is known in the art to provide an "overlay" network on top of the publicly-routable Internet. The overlay network may leverage existing content delivery network (CDN) infrastructure. The overlay network provides performance enhancements for any application that uses Internet Protocol (IP) as a transport protocol by routing around down links or finding a path with a smallest latency. As is well known, the Internet Protocol (IP) works by exchanging groups of information called packets, which are short sequences of bytes comprising a header and a body. The header describes the packet's destination, which Internet routers use to pass the packet along until it arrives at its final destination. The body contains the application data. Typically, IP packets travel over Transmission Control Protocol (TCP), which provides reliable in-order delivery of a stream of bytes. TCP rearranges out-of-order packets, minimizes network congestion, and re-transmits discarded packets.

TCP performance suffers as the round trip time between two endpoints increases. Longer round trip times result in increased connection establishment time, increased time to ramp up throughput during slow start, increased retransmit timeouts leading to decreased throughput, and throughput limitations imposed by receive window (especially if window scaling is not enabled).

BRIEF SUMMARY

Applications that run on an overlay network-based managed service achieve high performance gains using a set of TCP optimizations. In a first optimization, a typical single TCP connection between a client and an origin server is broken into preferably three (3) separate TCP connections. These connections are: an edge-to-client connection, an edge-to-edge connection, and edge-to-origin connection. A second optimization replicates TCP state along the connection to increase fault tolerance. In this approach, preferably a given TCP connection is maintained on two servers. When a packet is received by one server, called the primary, its state is updated and then passed to a second server, called the backup. Only when the backup sends an acknowledgement back to the primary can it then send a TCP acknowledgement back to the host that originally sent the packet. Another optimization reduces connection establishment latency. In particular, data is sent across the edge-to-edge connection before waiting for a SYN/ACK from a receiving region to be received by the sending region. This is achieved by generating a SYN/ACK packet (at the sending region) and feeding it back to the edge-to-edge connection. This causes TCP to treat the connection as established, thereby allowing data to flow.

The foregoing has outlined some of the more pertinent features of the subject matter. These features should be construed to be merely illustrative. Many other beneficial results can be attained by applying the disclosed subject matter in a different manner or by modifying the subject matter as will be described.

DETAILED DESCRIPTION

The subject disclosure may be implemented within the context of an overlay IP (OIP) routing mechanism that comprises a portion of a content delivery network (CDN). As is well-known, a content delivery network typically comprises a set of machines distributed around the Internet. Many of the machines are servers located near the edge of the Internet, i.e., at or adjacent end user access networks. Third party web sites and application providers offload delivery of content and applications to the CDN, which operates as a managed service. The CDN includes distributed infrastructure for data collection, monitoring, logging, alerts, billing, management and other operational and administrative functions. A typical CDN machine comprises commodity hardware (e.g., an Intel Pentium processor) running an operating system kernel (such as Linux or variant) that supports one or more applications. To facilitate content delivery services, for example, given machines typically run a set of applications, such as an HTTP Web proxy, a name server, a local monitoring process, and a distributed data collection process. The Web proxy includes or has associated therewith an edge server manager process to facilitate one or more functions associated with the content delivery network.

Figure 1:
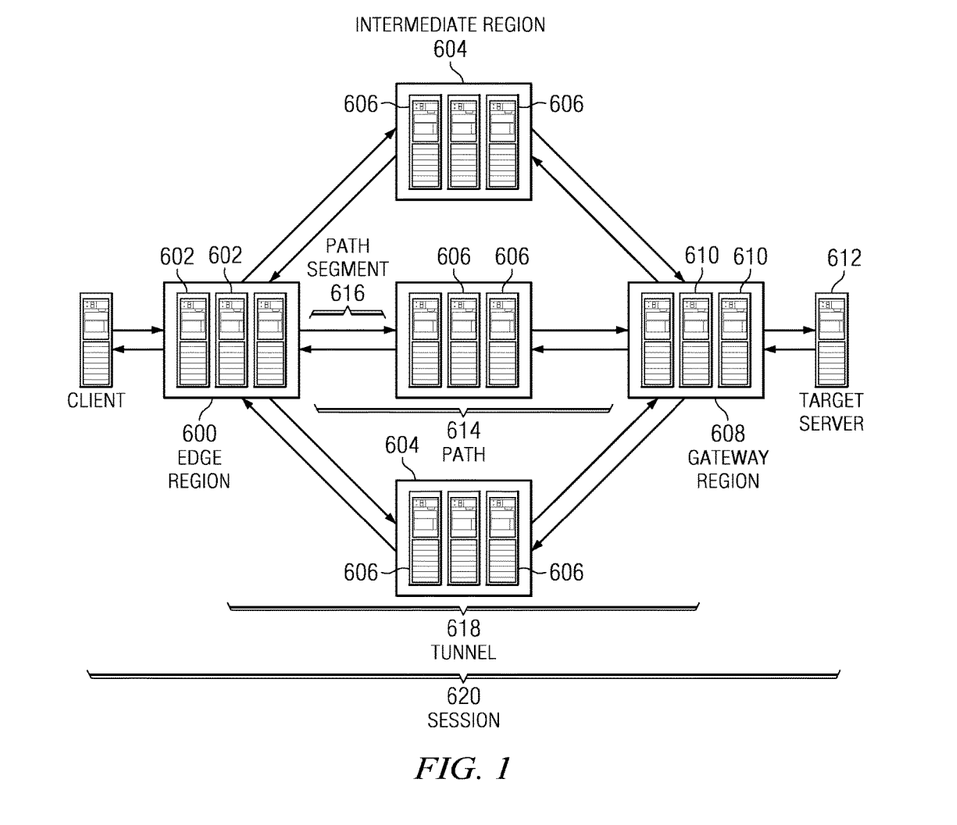
FIG. 1 illustrates an overlay IP (OIP) routing mechanism.

An OIP routing mechanism comprises a representative set of components, as illustrated in FIG. 1:

edge server 602—typically, a CDN edge server running an OIP edge server software process (oidp) as described below. As will be described, this software is responsible for receiving, encapsulating and forwarding IP packets.

edge region 600—typically, a CDN edge region configured for the overlay mechanism.

intermediate server 606—typically, a server that receives encapsulated packets from an edge region 600 or other intermediate servers and forwards them on to other intermediate servers or to a gateway region.

intermediate region 604—a region of intermediate servers.

gateway server 610—typically, an edge server that has been configured to receive encapsulated packets from the overlay, and that applies source network address translation (NAT) to the original packets and forwards them onto the target server.

gateway region 608—typically, a type of edge region comprising gateway servers and that is usually deployed on customer premises.

Target server 612—a machine whose traffic is to be tunneled through the overlay.

target address—the IP address of the target server; this address is sometimes referred to as a direct address when being compared to a CDN virtual IP address.

slot—a single "instance" of the overlay; preferably, a slot is a numbered index that corresponds to a single target address.

virtual IP address—typically, a CDN address that corresponds to a slot; preferably, there is one virtual IP address per edge region per slot. It is sometimes referred to as a VIP.

path 614—an ordered set of CDN regions between an edge region and a gateway region.

path Segment 616—a single hop of a path.

tunnel 618—a set of one or more paths from an edge server to a gateway server.

session 620—A single end-to-end connection from the client 622 to the target server; preferably, the session is defined by a five tuple (IP payload protocol, source address, destination address, source port, destination port). The source is the client and the destination is the target.

Figure 2:
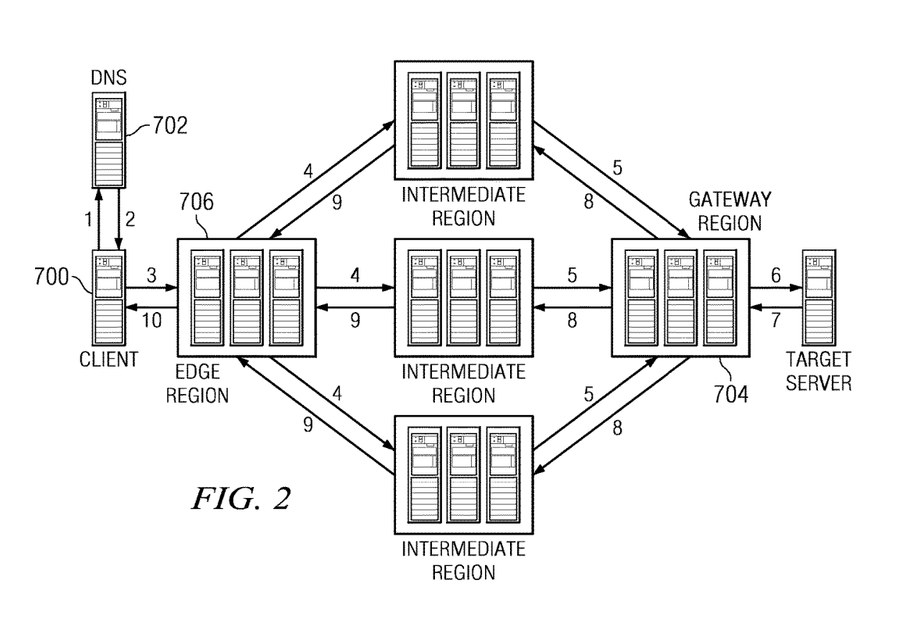
FIG. 2 illustrates how a set of clients can use the OIP routing mechanism shown in FIG. 1 to obtain remote access to an application.
Figure 3:
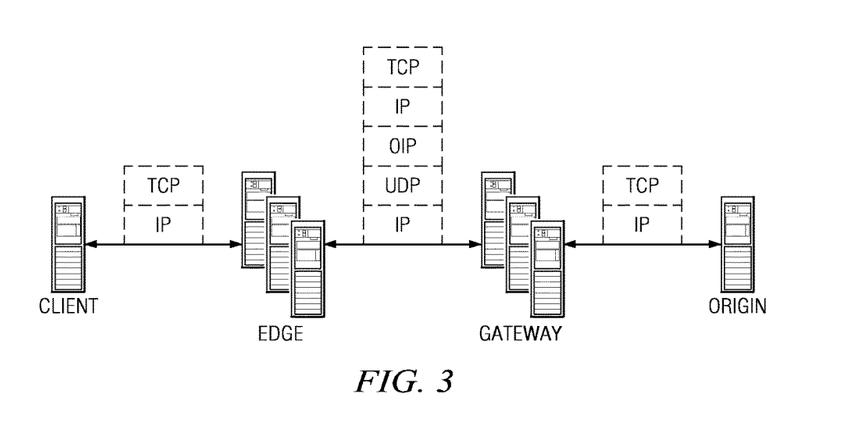
FIG. 3 illustrates how a single TCP connection between a client and an origin server is broken into separate TCP connections according to a feature of this disclosure.
Figure 4:
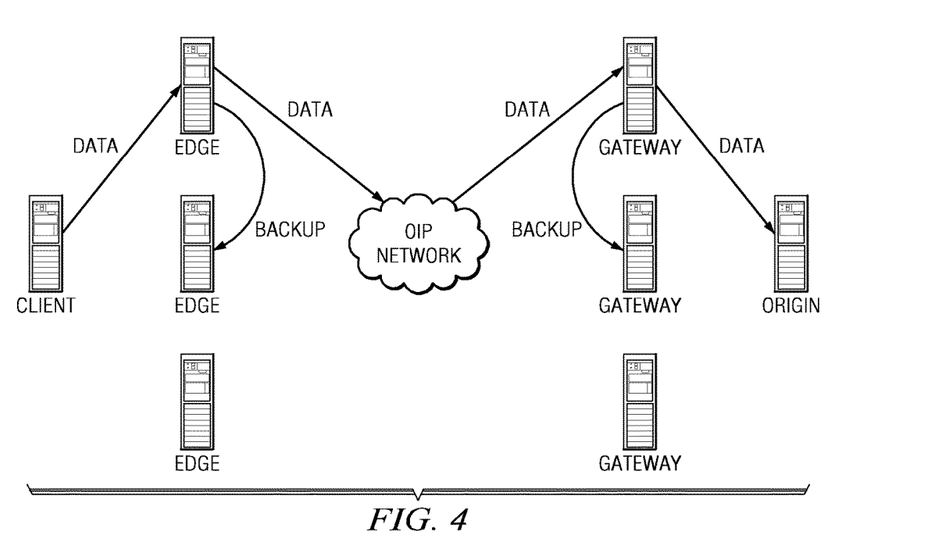
FIG. 4 illustrates how TCP connections are replicated to backup servers according to a feature of this disclosure to increase fault tolerance.

In one use scenario, one or more clients desire to send packets to a single IP address. This is illustrated in FIG. 2 and is now described. At step 1, the client 700 makes a DNS request to resolve a hostname. This hostname is aliased (e.g., by a CNAME) to a domain that is being managed by an authoritative DNS 702; typically, the authoritative DNS is managed by the CDN service provider. Preferably, this hostname corresponds to a single gateway region (and target address) 704. This is also referred to as a slot, as described above. At step 2, the DNS query returns a single IP address for the hostname. This address identifies a best performing available edge region 706 and, preferably, that region is dedicated to the hostname. The address is referred to as a virtual IP address, as described above. At step 3, the client 700 begins to send IP packets to the virtual IP address. These packets are received by a server in the edge region 706. The edge region 706 knows the gateway region 704 to which to send the packets based on the destination address in the IP packet header. The packet is then encapsulated. At step 4, and based on routes preferably provided by a CDN mapping system, the edge server in the edge region 706 sends out multiple copies of the encapsulated packets along multiple paths. One technique for performing this multiple path packet transport operation is described in U.S. Pat. Nos. 6,665,726 and 6,751,673, assigned to Akamai Technologies, Inc. As illustrated at step 5, several intermediate servers receive the encapsulated packets and forward them (either directly, or through other Intermediate Regions, not shown) to the gateway region 704, once again, preferably based on routes provided from the CDN mapping system. At step 6, the packets are received by a server in the gateway region 704, where duplicates are removed. Destination NAT translates the virtual IP to the target address and source Network Address Port Translation is applied to the packet before it is sent, so that the return traffic will also be sent over the overlay network. Preferably, information is stored so that return traffic is sent to the edge region 706 from which the client packet originated. At step 7, the gateway region 704 receives an IP packet from the target address and de-NATs the packet. The packet is then encapsulated. At step 8, multiple copies of the packet are sent along multiple paths. At step 9, the intermediate servers send the packets back to the original edge region for this session. At step 10, the packets are received by an edge server and duplicates are removed. The packet is sourced from the virtual IP address and then sent back to the Applications that run on an overlay-network based managed service such as described above can achieve high performance gains if the service terminates TCP connections on both ends of the network. Thus, preferably the service maintains one connection between the client and the edge, and one connection between the gateway and origin. Moreover, in a preferred embodiment, it is desirable to break a single TCP connection between a client and an origin server into three separate TCP connections. These connections will be referred to as: edge-to-client, edge-to-edge, and edge-to-origin respectively, and can be seen with reference to FIG. 3. The round trip times of the edge-to-client and edge-to-origin connections are small compared with most TCP connections given a reasonable deployment. To support fault tolerance requirements, preferably each TCP connection actually is maintained on two servers. When a packet is received by one server, called the primary, its state is updated and then passed to a second server, called the backup. This operation is illustrated in FIG. 4. Only when the backup sends an acknowledgement back to the primary can it then send a TCP acknowledgement back to the host that originally sent the packet. This TCP state replication increases fault tolerance.

System Data Flow

This section examines data flow for connection establishment, data transmission, and connection tear down.

TCP Connection Establishment

When the client starts a new connection, it gets an IP address, referred to as a VIP, from a name server. This address determines a suitable edge region, and a machine within the edge region. The client allocates a local port in the usual fashion, and it sends a connect message (SYN) to the edge server's VIP. On receipt of the SYN, the edge server initiates a new connection over the OIP network. Further details of this network are described in Ser. No. 11/323,342, filed Dec. 30, 2006, which application (as a whole) is incorporated herein by reference. The OIP region to connect to is associated with the VIP; typically, this region is static and is set at a provisioning time. While the edge-to-edge connection is being formed, a suitable backup within the source region is located and is sent state information sufficient to recover the connection if necessary. When a confirmation from the backup is received, then a SYN/ACK is sent back to the client. In choosing the initial sequence number to return to the client, a value that will allow in-region routing to determine the initial primary for this connection preferably is selected. Preferably, this value is encoded in the upper six bits of the sequence number.

To speed up data flow across the edge-to-edge connection, it is desirable to send data across the OIP network before waiting for the SYN/ACK from the receiving region to be received. Accordingly, and as described in more detail below, this is achieved by generating a SYN/ACK packet and feeding it back to the edge-to-edge connection. This causes TCP to treat the connection as ESTABLISHED, and allows data to flow.

At some point, typically around this time, the edge server receives an ACK from the client. Until the initiating side receives a SYN/ACK from the receiving side of the connection, preferably packets are sent with a special OIP header.

On the receiving side, when the SYN is received, a new edge-to-origin connection is initiated using an address and port assigned from the NAT address/port space associated with this machine. A suitable backup machine is then located and the newly created state is forwarded to this backup. Preferably, this machine has two TCP state machines, one for the edge-to-edge connection and one for the edge-to-origin connection. When the edge-to-edge state has been backed up, a SYN/ACK is sent to the initiating side of the edge-to-edge connection.

Then, the SYN for the edge-to-origin connection is sent to the origin. When the response is received, a connection exists. Preferably, this SYN/ACK is acknowledged only after the state has been backed up to the backup processor. At this point, SYN/ACK is sent to the initiating edge.

If the server does not allow a connection for some reason, then a reset is sent back to the initiated edge server, which then forwards a reset back to the client. Under certain circumstances, this means that a client may start a transmission that is aborted where a direct connection would have resulted in an immediate connection failure.

Figure 5:
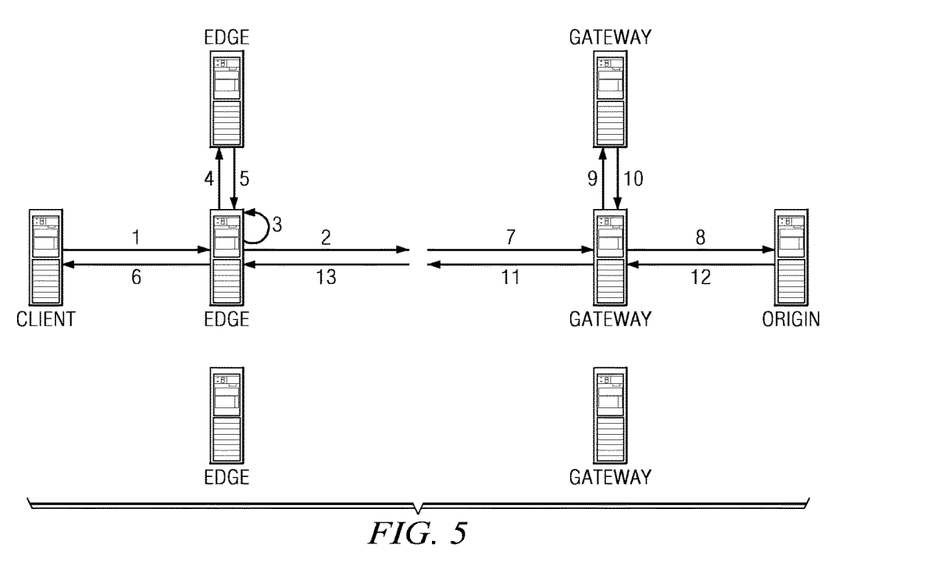
FIG. 5 illustrates a set of TCP connections being established in an overlay network according to this disclosure.
Figure 6:
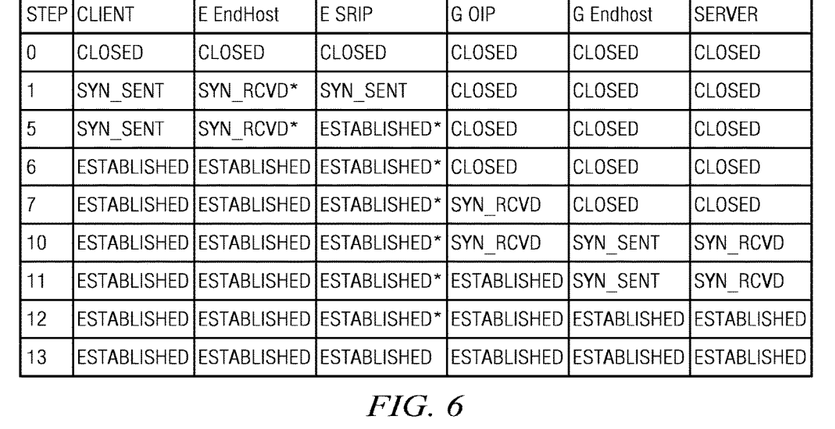
FIG. 6 is a TCP connection state table for the various steps shown in FIG. 5.

At this point, all three TCP connections are established. This TCP connection establishment process is illustrated in FIG. 5 and is described by the following numbered steps. FIG. 6 is a TCP connection state table corresponding to these steps. (In this table, SYN_RCVD* means the SYN is received but a SYN/ACK has not been sent yet; ESTABLISHED* means data is being sent but additional information is included in the OIP header).

1. Receive SYN from client.
2. Initiate edge-to-edge connection with SYN.
3. Generate a quick SYN/ACK for the edge-to-edge connection to allow the sending edge region to send data immediately. The connection is not really established yet. In particular, any data packets that are received before a SYN/ACK is received from the gateway have their ACK bits cleared before transmission.
4. Send TCP state to the backup.
5. Receive response from the backup.
6. Send a SYN/ACK to the client.
7. The message arrives at the receiving side of the edge-to-edge connection (the actual order here is not required for correct operation; a benefit is obtained from the system if this happens later than step 5).
8. Send the SYN/ACK to the origin.
9. Create TCP connection with appropriate addressing and send TCP state to backup.
10. Receive response from the backup.
11. Send a SYN/ACK for the edge-to-edge connection.
12. Receive ACK from the server.
13. Edge side receives the edge-to-edge SYN/ACK from the OIP network.

TCP Data Flow

Figure 7:
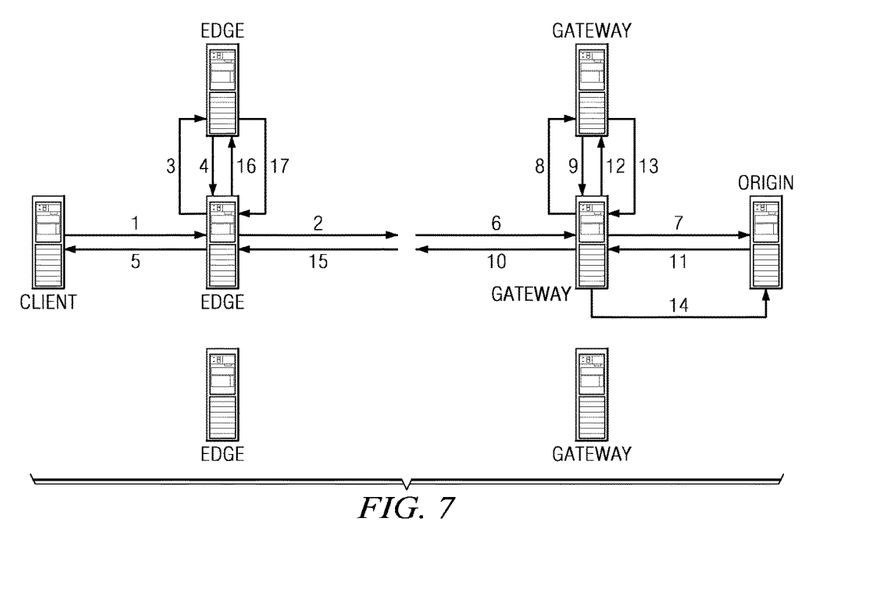
FIG. 7 illustrates the data flow in the overlay of FIG. 5 following connection establishment.

Data flow is similar to connect, except that there is the possibility that there will be various combinations of data and ACK numbers in the messages. When a given daemon executing on the edge server (called oipd) processes the messages, it checks for duplicates so that they are not forwarded through the network. FIG. 7 illustrates the data flow, and each numbered step is described below.

1. Data received from the endpoint host (client in this example, but the process works the same in the other direction).
2. sripd transmits the data over the edge-to-edge connection.
3. Data is moved from the edge-to-endpoint connection to the edge-to-edge connection by reading from the former connection and writing to the latter. This increases the ACK count on the edge-to-endpoint side, and results in the transmission buffers being filled on the edge-to-edge side. Preferably, both state machines are then sent to the backup, along with the data.
4. Backup confirms receipt of the state and data
5. oipd sends an ACK to the sending endpoint.
6. The message arrives at the destination side of the edge-to-edge connection (the actual order here is not required for correct operation; a benefit is obtained from the system if this happens later than step 5).
7. oipd sends data across the edge-to-endpoint connection.
8. Data is read from the edge-to-edge connection and sent to the backup.
9. oipd receives a response from the backup.
10. oipd sends an ACK over the edge-to-edge connection.
11. oipd gets an ACK from the server. (If there is data in the message, this can be thought of as step 1 in the other direction.)
12. oipd sends a copy of the new state machines to the backup.
13. Get acknowledgement from the backup.
14. oipd sends an ACK to the server.
15. The ACK message is received from the edge-to-edge connection.
16. If there is any change of state, the state of the TCP machines is backed up.
17. Receive confirmation from the backup.

TCP Connection Tear Down

The tear down process starts when an endpoint host sends either a FIN or a RESET. The FIN case is straightforward. A FIN flag may be set on any message and indicates that no new data will be sent on this connection. This flag has to be passed on so that the TCP peer gets the message, because otherwise it may affect the operation of the TCP server. From the system perspective, however, it is just like a data message. A message that differs from a previous message only in that FIN flag must be forwarded.

The following sequence of messages may be sent for a normal shutdown. There are a number of cases, depending on whether the client shuts down first, or if the server shuts down. In some cases, the client might shut down but continue to receive data from the server. The complementary case is also possible. In the case shown below, the client signals a shutdown by sending a FIN. The server follows up with a FIN/ACK. Following the FIN/ACK, a final ACK is then sent. The basic propagation and shutdown follows a similar sequence in all the cases. Note that final shutdown requires a timeout for the side that initiates the shutdown.

1. Client sends a FIN. Update the edge-to-endpoint state to FIN_WAIT1. This is passed to the edge-to-edge connection state, which does the same.
2. Backup the new states.
3. Backup confirms.
4. Forward FIN over the edge-to-edge connection. (Note that the backup/forward order is different from the data case.)
5. Respond to client with ACK.
6. Receiving side of edge-to-edge connection gets message. It is sent to the endpoint host connection.
7. Send FIN to origin.
8. Backup the new states—both edge-to-edge and edge-to-origin TCP machines are in FIN_WAIT1.

9. Backup confirms.

10. Send ACK over edge-to-edge connection. Unless there is data in the message (there could be), this is not a significant message.

11. Origin responds. If this is a FIN/ACK, setup to send the final FIN/ACK to the origin and enter CLOSING (to send last ACK). When time out occurs, the state machine terminates; forward the FIN/ACK to the edge-to-edge connection.

12. Backup the state machines.

13. Backup responds.

14. Send ACK to origin.

15. Send FIN/ACK to edge-to-edge connection.

16. Edge receives FIN/ACK from gateway.

17. Pass the FIN/ACK to the edge-to-client connection. Update the state machines.

18. Backup the state machines.

19. Send the FIN/ACK to the client endpoint host machine.

20. Respond with an ACK to the edge-to-edge. Enter TIME_WAIT.

21. Client sends the final ACK (for our FIN). The end host can now shutdown.

22. The gateway server gets the ACK from the edge server. It now enters CLOSED.

23. All of the TIME_WAIT timers expire. This can happen in any order.

Figure 8:
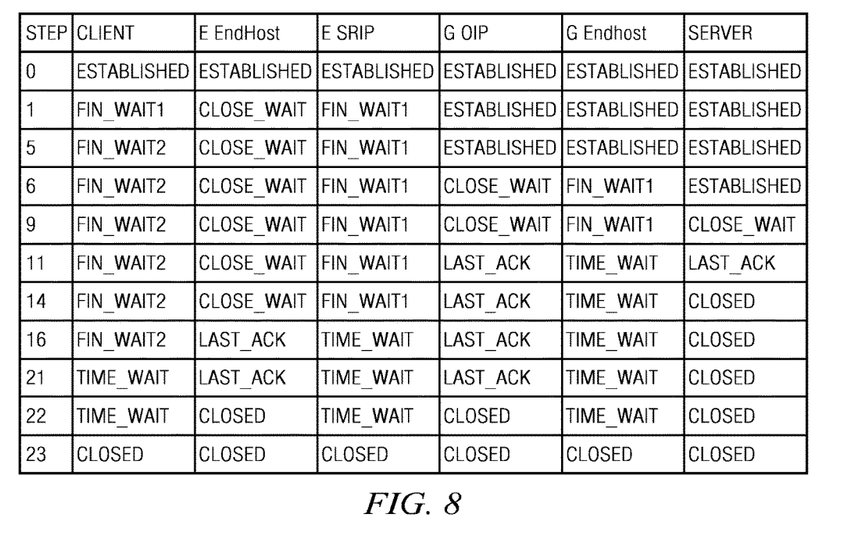
FIG. 8 is a TCP connection state table during connection shutdown.

The messages that result in TCP state changes are noted in the table shown in FIG. 8.

TCP Connection Reset

The following sequence of messages may be sent for an RST shutdown. The flow when the RST comes from the client may be as follows:

1. Client sends an RST. Shutdown the edge-to-client connection.

2. Forward the RST to the destination side of the edge-to-edge connection.

3. Backup the new states, which in this case is to destroy the state machine.

4. Backup confirms.

5. Gateway gets the RST.

6. Send RST to origin.

7. Backup the new states-both TCP machines are deleted. Any further traffic results in an RST response.

Figure 9:
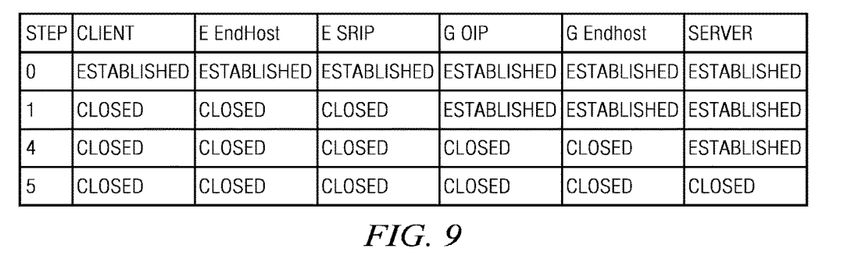
FIG. 9 is a TCP connection state table during connection reset.

The messages that result in TCP state changes are noted in the connection table of FIG. 9. This table shows the relative states across the state machines.

Fault Tolerant TCP and the Backup

To guarantee support of long-lived connections given hardware, datacenter, and operational requirements, it is preferably that the state for each TCP connection be fully replicated on another machine in the same edge region—this is referred to as the backup. When data arrives at the primary, it updates its TCP state and reliably sends this information to a backup before sending an acknowledgement of the data to the sender.

The following provides additional details regarding the backup mechanism.

Detecting Peer Death

Preferably, all machines in the region are constantly checked for liveness. A machine will be determined "down" with respect to oipd if a message (including heartbeats) is not heard from the peer in a specified amount of time. When a machine is down, it will not be sent connection synchronization messages.

Choosing a Backup

When a primary receives a SYN for a new connection, a peer is chosen as the backup for the connection. A backup is chosen randomly from the set of live, unsuspended peers (e.g., those that are shown to be live machines in a map for the service) in the region. If not enough unsuspended peers exist to handle the load, then a suspended peer may need to be chosen; the threshold for this is configurable.

It is assumed that any machine capable of functioning as a primary is also capable of functioning as a backup (and vice versa), and that if there are enough resources available to accept a new connection there are also enough resources for that connection to have a backup. This means that, in the steady state, each connection will always be backed up unless there is only one live machine in the region.

When the load for a region is nearing capacity, the region may not be able to continue supporting backups. One option is allow more connections at the expense of forcing some connections to run without a backup.

Running with no Backup

If no machine in the region is capable of serving as the backup for a connection, it may be necessary for the primary machine to operate without a backup. Obviously, running without a backup reduces the fault tolerance of the system, so that any failure of the primary machine would be enough to break the connection.

If a primary for a connection with no backup rolls, when it begins receiving data, it will determine it does not have TCP state for the connection and realize via in-region connection information synchronization that there is no backup. In such case the primary logs the condition and resets the connection.

When the Backup Does Not Respond

If the backup does not acknowledge backup requests, the corresponding data will not be acknowledged until the backup is declared "dead."

Initializing a New Backup

Typically, there are two events that will trigger the selection of a new backup. The simple case to handle is the establishment of a new backup for a brand new connection. The send and receive queues for both the edge-to-endpoint and edge-to-edge TCP connections will be empty, and so the only information that needs to be sent to the backup are the connection entry and the newly created TCP state machines.

The more difficult case for backup initialization is the transition from no-backup mode to backup mode for an existing connection, or if a new backup needs to be chosen as a result of suspension. In these cases, the primary will potentially have a large amount of unacknowledged data queued up for one or both TCP connections. The backup cannot safely take over as primary until either all of this data has been acknowledged, or until all of this data has been successfully transferred to the backup. To address this situation, preferably the system allows a primary to start using a new backup immediately and makes it optional for the primary to copy prior unacknowledged data to the new backup. This means that a backup may not have access to all of the unacknowledged data when it takes over as primary for a connection. Thus, the primary will therefore need to be able to detect when it needs to retransmit data that it does not have, and in this case the connection should be reset.

Backup Message Contents

The messages sent to a backup typically include the TCP state machines for both upstream and downstream connections;

data that is yet to be acknowledged and has not been sent to the backup yet.

Suspension and Peer Death

When oipd detects that a peer has died or a peer has become suspended, primary and backup roles must be reassessed.

1. For every connection which oipd is a backup and the primary has died or been suspended, the backup promotes itself to primary.

2. For every connection which oipd is the primary and the backup has died or been suspended, a new backup must be chosen. Preferably, this function is rate-limited to minimize spikes in load associated with bringing a new backup up to state.

When Backup Promotes to Primary

When a backup determines that the primary has failed or been suspended, it will indicate that its static IP address should be associated with the connection in all connection sync messages. This causes new packets for that connection to be sent to the new primary. If for some reason the new primary does not have a segment of data that is being asked for by the other end of the connection, it resets this connection. This may be a recoverable condition in case of a suspension because another live machine in the region typically will still have the data.

When a Different Backup is Chosen

In the case where a new/different backup must be chosen as a result of a peer death or suspension, the new machine is indicated as the backup in the connection synchronization messages so all machines in the region become aware of the transition. The primary then sends the new backup only the TCP state, not the data.

Load Balancing and Region Packet Forwarding

Load balancing should take the following into account:

1. The load induced by being primary for a connection is several times greater than to process region ingress data.

2. No single machine should have to handle all of the connections for a particular slot.

3. It must behave well under long lived connections.

4. It must behave well under very short lived connections.

Preferably, connection related information is updated with each packet. As a result, when a packet arrives at a machine which is not the primary for the connection, that machine preferably does one of the following:

1. Determine who the primary is for the corresponding connection and forward the packet there. This technique is preferred.

2. Acquire the TCP connection state from the primary and become the new primary for this connection.

TCP Transport over OIP

The TCP state machines (processor-executable software) on both ends of the edge-to-edge connection preferably behave exactly the same way as the edge-to-endpoint connections.

TCP Connection Events

Preferably, each oipd maintains two TCP connections for a corresponding "end to end" connection. For example, on the client side edge, oipd maintains a connection from edge-to-client and edge-to-edge. This section describes how those two connections relate to one another. The TCP behavior preferably is the same if the upstream connection is the client or an oipd edge server. Likewise, the downstream connection can be an oipd edge or the origin. In other words, this TCP glue code does not care if the underlying protocol is IP or OIP.

Note: Some of the following events require only a partial ordering for correctness. Some diagrams include a numbering that indicates this partial ordering.

There are four basic events:

1. A packet is ready to be read. This may be data, SYN, ACK, FIN, RST, or combination.

2. A TCP timer event generated from one of the TCP engines.

3. A backup request is received.

4. An acknowledgement is received from the backup.

Read Event

When a packet arrives (from upstream for purposes of this discussion) to be read, the following occurs:

1. The TCP engine fully processes the packet by applying all relevant state changes.

Figure 10:
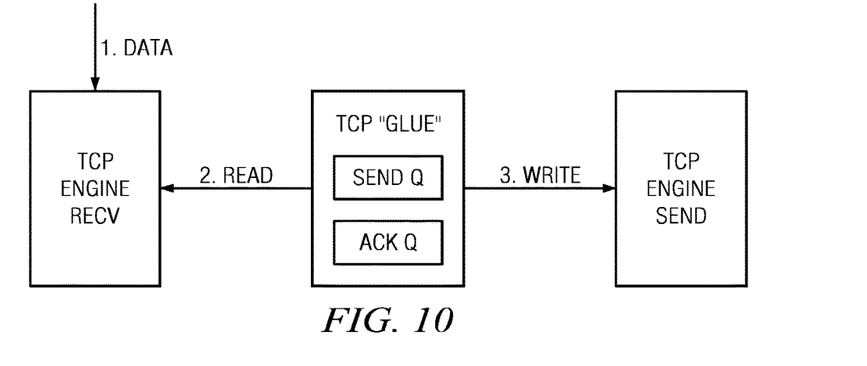
FIGS. 10-19 illustrate how TCP connection events are managed when backup connections are implemented.
Figure 11:
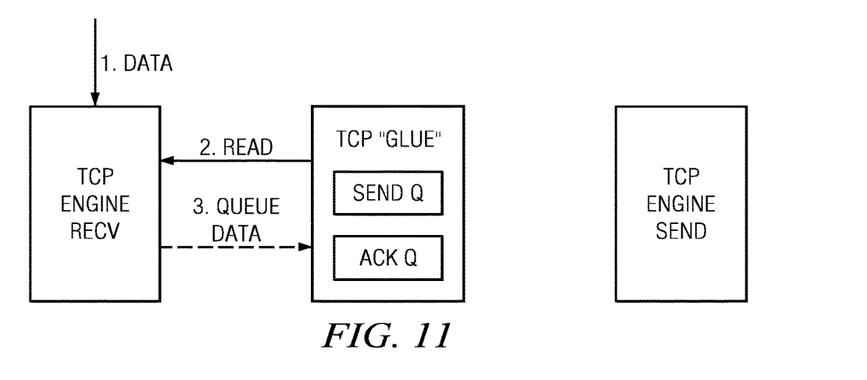

2. If there is data in the packet:

The data is read into the transit queue, which is a queue of data that has been read from upstream side of the connection pair, but not yet written to the downstream side. If the downstream connection is opened and has room in its send buffer, then the data is written to the downstream socket. This is shown in FIG. 10. If the downstream buffer cannot be written either because the connection is not complete or because there is no room, the data remains in the transit buffer. This is shown in FIG. 11.

Figure 12:
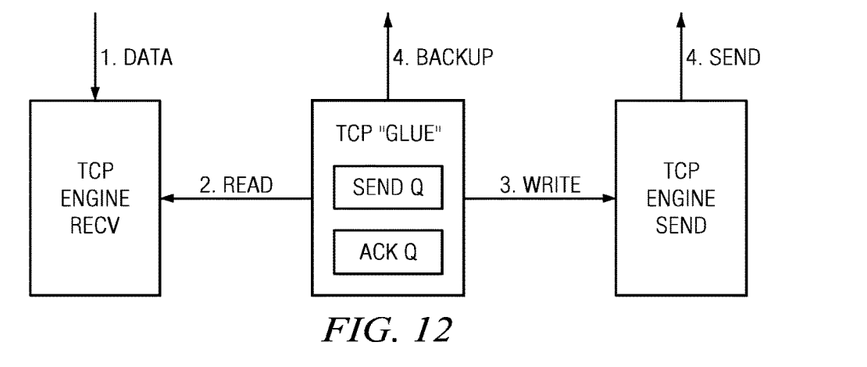

If the size of the transit queue is greater than zero, the upstream connection's receive window is decreased by the size of the queue or set to be zero, whichever is larger. The downstream connection may send the new data if it was copied into its buffer, subject to receive and congestion windows, and other timers. The new state and new data is sent to the backup for the connection. The backup and data sending events can happen in either order and still be correct. This is shown in FIG. 12.

Figure 13:
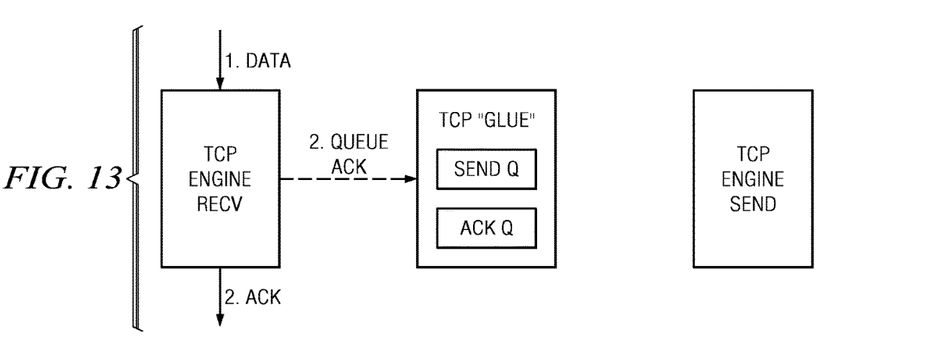

If the processing of the packet generates an ACK packet in response, this ACK number must be compared to the highest ACK number that has been acknowledged by the backup. If it is lower than or equal to the backed up ACK number, the newly generated segment can be sent upstream. If it is higher, the packet must be queued until the backup acknowledges it. FIG. 13 shows both cases.

Figure 14:
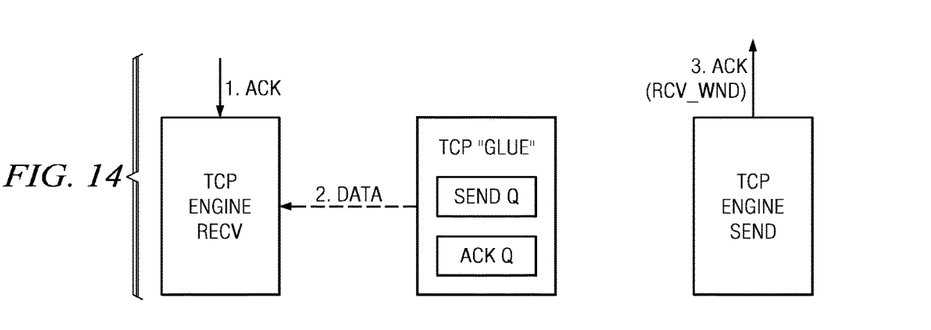

3. If the packet is acknowledging new data (see FIG. 14):

The acknowledged data is removed from the TCP retransmit queue and the size of the queued data is correspondingly reduced.

A callback is made, which allows any data in the transit queue to be "written" to the transmission buffers.

Data is removed from the transit queue, which allows increasing the upstream receive buffer size (which may result in a window advertisement for additional data).

4. If the packet is a SYN:

Create a new active connection downstream (including the faked SYN/ACK if appropriate).

Create a new connection object to sync across the region.

Send the new states and the newly created connection object to the chosen backup.

5. If the packet has the FIN bit set,

Forward FIN state downstream.

Send new state to the backup.

6. If the state is in FINAL ACK and the packet has the ACK for the sent FIN,

TCP engine destroys the socket.

Send cleanup message to the backup.

7. If the packet is a RST,

Forward RST downstream.

Close the connection.

Send cleanup message to the backup.

Timer Events

One of the two TCP engines may generate packets based on timers.

Figure 15:
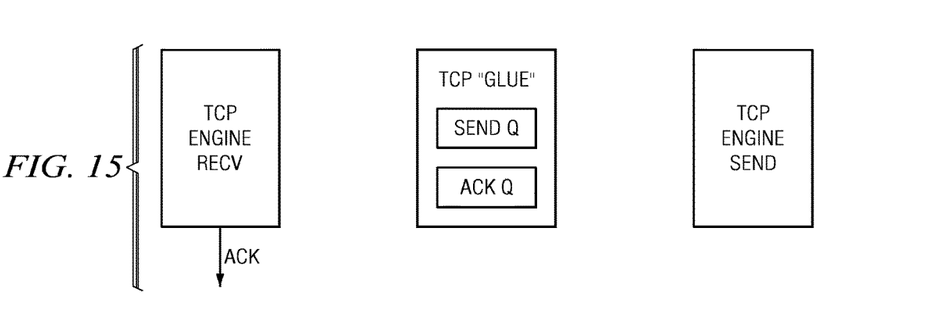
Figure 16:
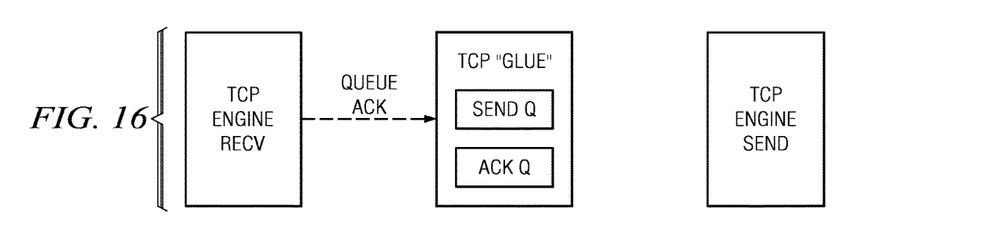

1. If the timer event generated a delayed ACK packet, the ACK number must be compared to the highest ACK number that has been acknowledged by the backup. If it is lower than or equal to the backed up ACK number, the newly generated segment can be sent upstream. This is seen in FIG. 15. If it is higher, the packet must be queued until the backup acknowledges it. This is seen in FIG. 16.

Figure 17:
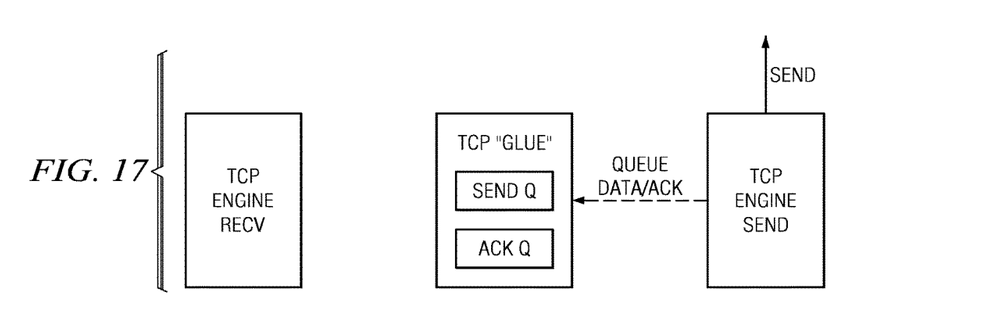

2. If the timer event was a retransmit, forward the packet to the downstream connection subject to the backup ACK constraint described above. This is seen in FIG. 17.

3. If the timer event is TIMED_WAIT, destroy the connection and send a cleanup message to the backup.

Figure 18:
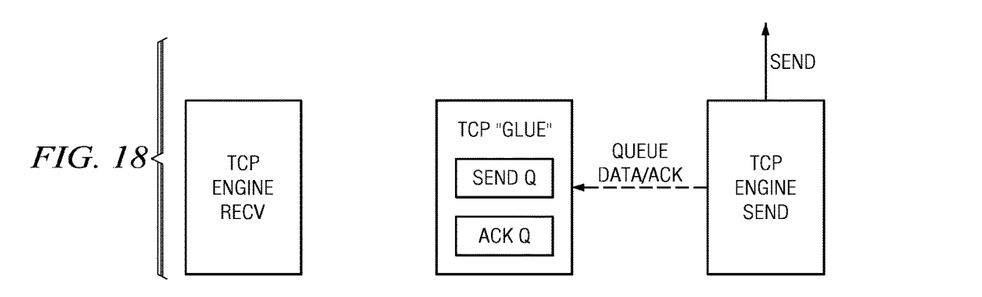

4. If the timer is a keep-alive timer, forward the keep-alive packet downstream, again providing the ACK number has already been acknowledged by the backup. This is seen in FIG. 18.

Receiving a Backup Request

1. Replace TCP state information. This information includes the current socket state, and the transmit buffer headers.

2. En-queue new data.

3. Cleanup all data held for retransmission that has been acknowledged (ACKed).

4. Generate an acknowledgement response.

Backup Acknowledgement Event

A backup acknowledgement in this case means it is appropriate for the TCP ACK to be sent back to the sender. It either signifies that there is a backup for the connection, and it has successfully stored the state and data, or there is NO backup for this connection due to some error/transient condition and TCP processing should not be delayed.

Figure 19:
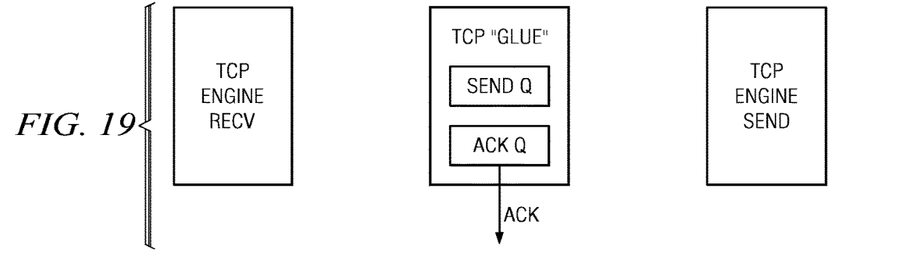

1. All packets that have been queued upstream that have an ACK number that is less than or equal to the ACK number for the corresponding packet that has been processed by the backup should be sent. This is shown in FIG. 19.

Addressing

A four-tuple (source address, destination address, source port, destination port) for TCP transport over the OIP network preferably meets the following requirements.

1. The four-tuple in its entirety is needed to look up the appropriate socket structure for that TCP connection.

2. The destination port used will be the destination port that traffic will be relayed to on the other side of the OIP network.

3. There must be enough information to perform in-region forwarding on either side if a packet shows up for a connection at a machine that is not the primary or backup and the machine does not know who the primary or backup is.

Eliminating Connection Establishment Latency

Figure 20:
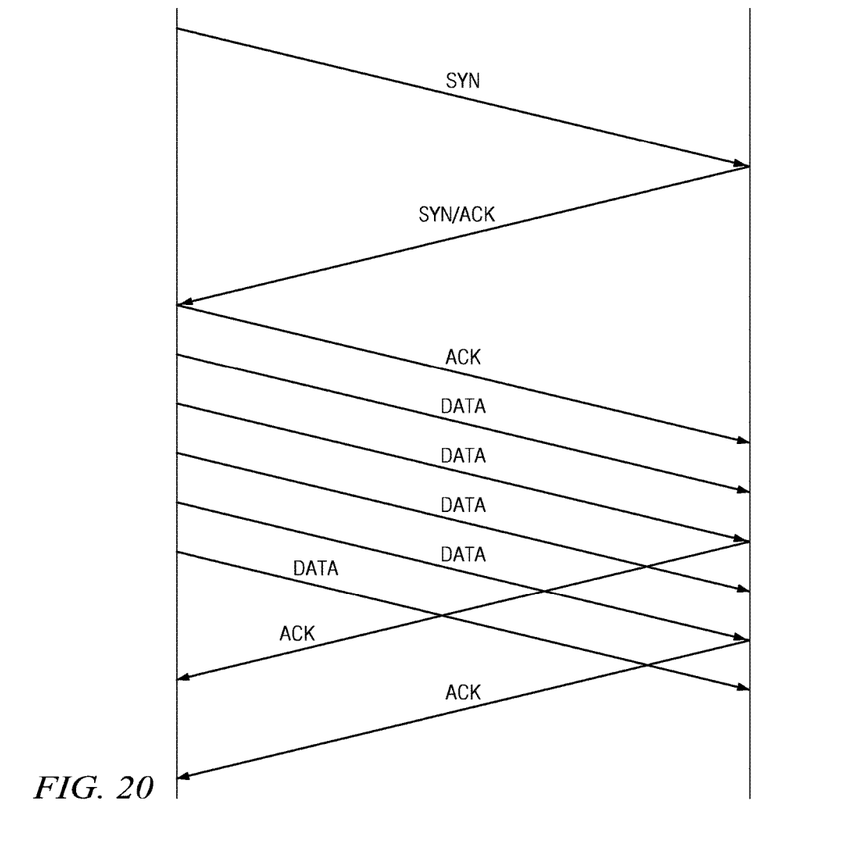
FIG. 20 illustrates conventional TCP connection and data transfer.

When an edge-to-edge connection following the standard TCP connection protocol is established, one complete round-trip time across the ORIP network for connection start is required. This is because data cannot be sent until a SYN/ACK is received from the destination region. FIG. 20 illustrates the conventional TCP operation. As can be seen, there are one and one-half round trip times before any data can show up on the gateway side of the connection. This is undesirable.

Figure 21:
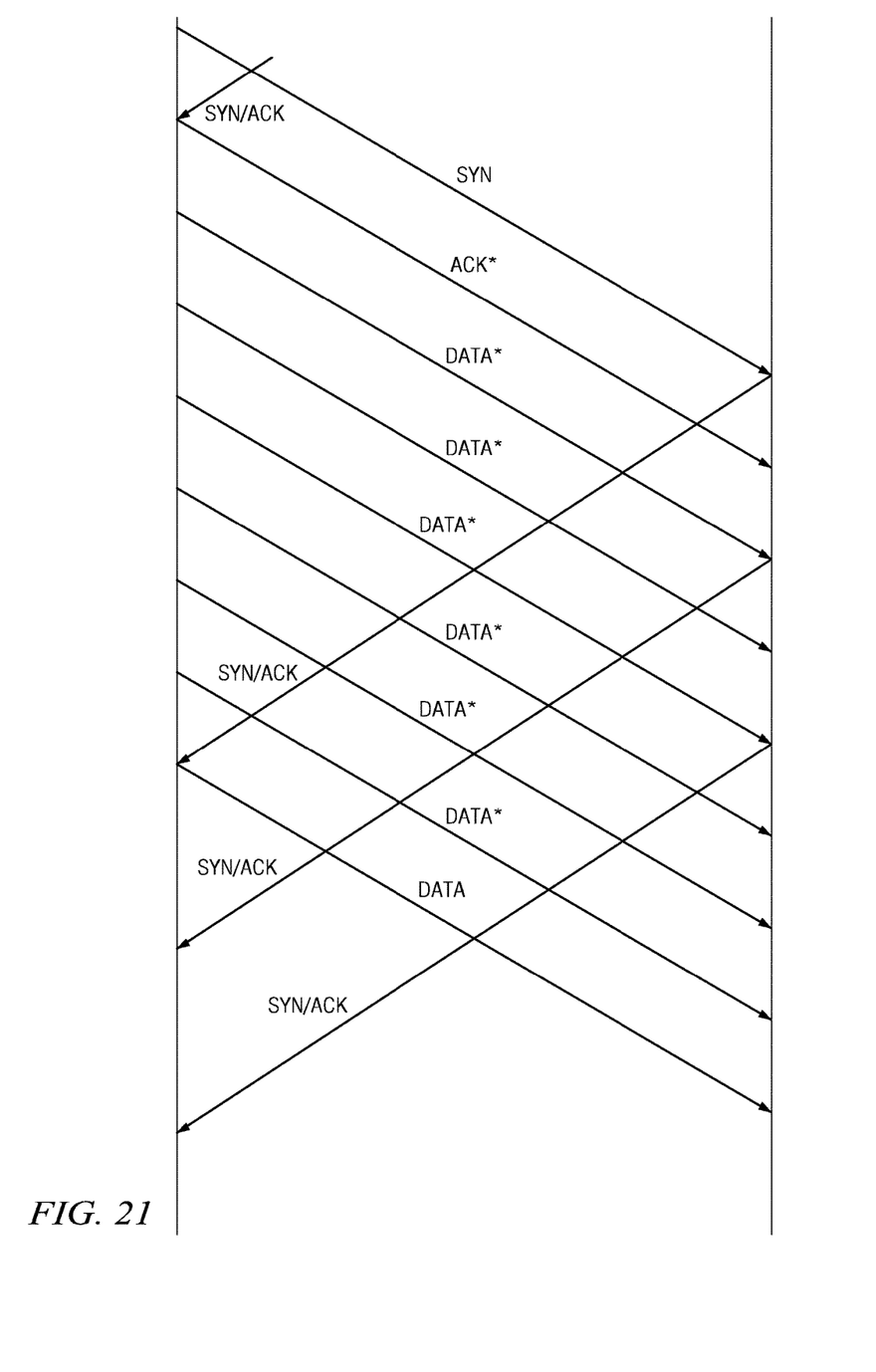
FIGS. 21-22 illustrate an accelerated SYN/ACK and data transfer operation.
Figure 22:
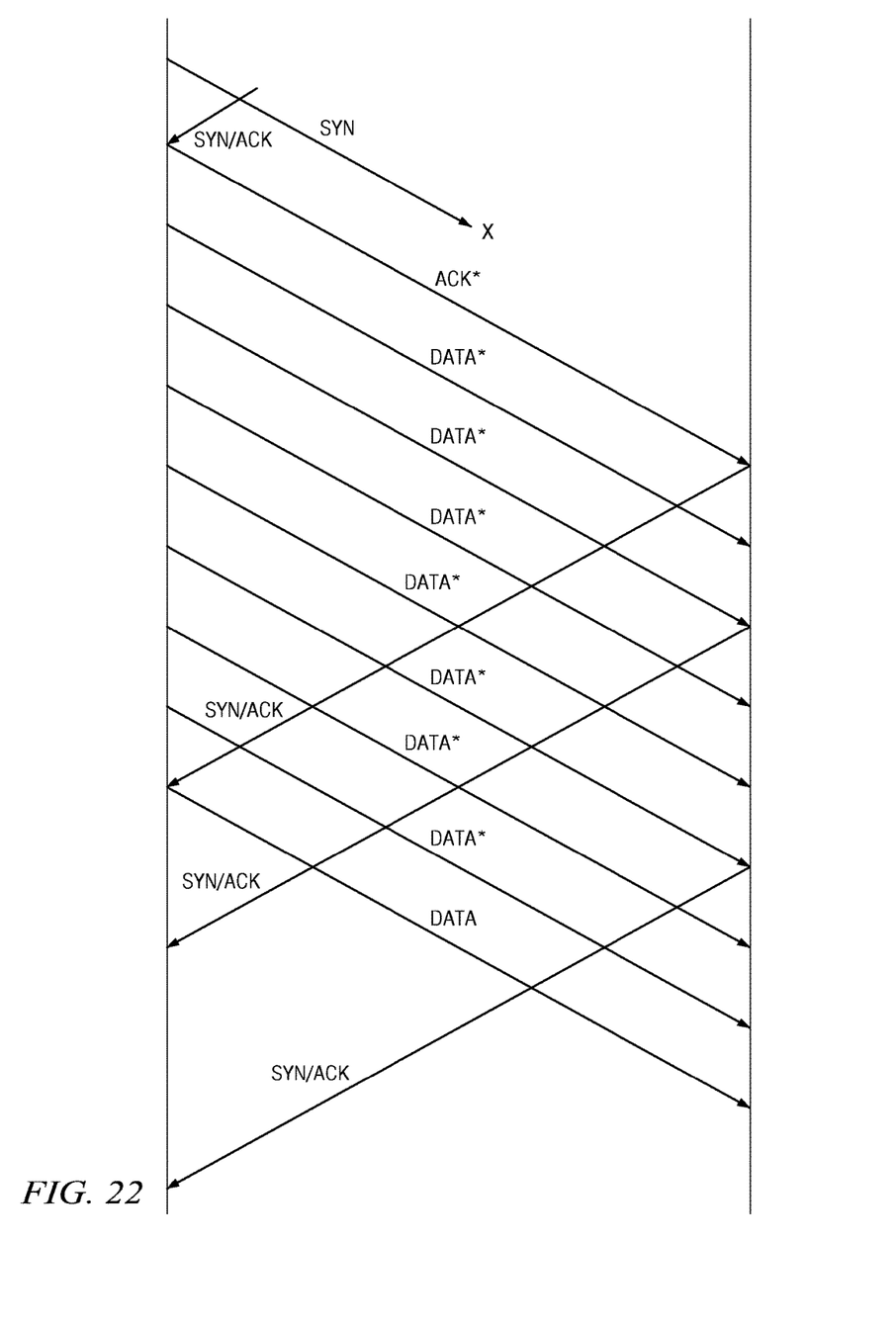

An accelerated SYN/ACK and data transfer operation is preferred, and it is shown in FIGS. 21-22. As can be seen in FIG. 21, data can be sent from the source edge and received by the destination region very shortly after the SYN, about one round-trip time sooner.

The process is as follows:

1. When sending an initial SYN over the edge-to-edge connection, choose:

SEQ: random initial sequence number

ACK: Suggested initial sequence number to get from the other side of the connection. Preferably this value is derived from cached previous connections using the same (OIP specific) addresses.

TCP OPTIONS: Will include MSS, window scale factor, SACK permitted

2. After sending the SYN over the edge-to-edge connection, oipd fakes receiving a SYN/ACK from that connection. It has the values:

SEQ: The value in the ACK field of the origin SYN packet.

ACK: The value of the SEQ field+1 in the origin SYN packet.

TCP OPTIONS: The options that the origin side generates must match whatever data is "faked" here. One way to do this is for the origin side to choose its options exactly to be what it received in the SYN. That is, the client side gets to choose the options that BOTH sides of the connection use.

After receiving this message, this side of the TCP connection generates an ACK packet and is in the ESTABLISHED state.

3. Until the client side of the connection receives a real SYN/ACK packet, outgoing data packets must be constructed in a special way. (This includes the ACK of the third piece of the connection handshake that was sent at the end of the previous step.) These packets have the ACK bit cleared, and are denoted with a "*" in the diagram.

SEQ: Normal sequence number for the data being sent.

ACK: Suggested remote initial sequence number described in step 1.

OIP HEADER: as described below, this option contains the values for MSS, window scale factor, and SACK permitted as listed in the options in step 1.

4. The origin side edge, upon receiving the SYN, begins to establish a TCP connection as it normally would but using the TCP options in the OIP header for its side of the connection as well. If the original SYN got lost or reordered, when the origin side edge receives a data packet with the ACK bit cleared and the OIP option, it is able to reconstruct the original SYN. This is illustrated in FIG. 22.

5. The origin side edge then generates a SYN/ACK to send back over the OIP network.

6. The origin side edge begins to receive data packets, which will include an ACK for the SYN/ACK indicating it is safe for the origin side of the connection to start sending data. In other words, it only takes one half round trip time plus transmission for two or more packets before the origin side of the connection is also ESTABLISHED and can send data. As a result of faking the SYN/ACK on the client side, there is no reason to fake the ACK on the origin side.

7. The client side edge receives the SYN/ACK, and at this point stops sending the OIP option and clears the ACK bit. The SYN/ACK can safely be processed by the TCP engine, because it will appear to be a duplicate packet.

Note: it is desirable for the TCP engine for the edge-to-edge connections to generate segments that take the additional OIP option length into account.

OIP Option Header (Initial TCP Data)

The fast connection initialization scheme described above requires that both the edge and gateway initial sequence numbers be transmitted in every packet until the connection is fully initialized. This ensures that the SYN that is generated on the gateway side will match the original initial SYN packet that was sent by the edge. The gateway initial sequence number can be safely sent in the ACK field of the special edge-to-gateway packets. The edge's initial sequence number cannot be determined from the TCP packet itself, however, and so it is sent in the OIP header using an option of type 4. This option will only be included in the special fast connection establishment packets and must be included in all such packets. In addition, option type 4 will also include the MSS and window scale values, and flags to indicate support for the timestamp option and SACK. Preferably, the type field for this option is located in the first byte of a 32 bit word to ensure that the initial sequence number is properly byte aligned. Padding should be performed if necessary.

The hardware and software systems in which the disclosed subject matter is illustrated are merely representative. The techniques herein may be practiced, typically in software, on one or more machines. Generalizing, a machine typically comprises commodity hardware and software, storage (e.g., disks, disk arrays, and the like) and memory (RAM, ROM, and the like). The particular machines used in the network are not a limitation of the present invention. A given machine includes network interfaces and software to connect the machine to a network in the usual manner. As described above, the disclosed subject matter may be implemented as a managed service (e.g., in an application service provider or "hosted" model) using the illustrated set of machines, which are connected or connectable to one or more networks. More generally, the service is provided by an operator using a set of one or more computing-related entities (systems, machines, processes, programs, libraries, functions, or the like) that together facilitate or provide the inventive functionality described above. In a typical implementation, the service comprises a set of one or more computers. A representative machine is a network-based server running commodity (e.g. Pentium-class) hardware, an operating system, an application runtime environment, and a set of applications or processes (e.g., servlets, linkable libraries, native code, or the like, depending on platform), that provide the functionality of a given system or subsystem. As described, the service may be implemented in a standalone server, or across a distributed set of machines. Typically, a server connects to the publicly-routable Internet, a corporate intranet, a private network, or any combination thereof, depending on the desired implementation environment.

The TCP optimizations may be implemented within an operating system kernel or as an adjunct to the kernel, or as a separate application.

Having described our invention, what we now claim is set forth below:

1. An article comprising a non-transitory computer product implemented in an overlay network, the overlay network comprising at least one or more edge regions, and one or more gateway regions, wherein each edge region and each gateway region comprises one or more servers, and wherein a client is coupled to an edge region to communicate with an origin server coupled to a gateway region, and wherein a first hardware processor is associated with a server in an edge region, and a second hardware processor is associated with a server in a gateway region, the computer product comprising:

first program code executed by the first hardware processor as a client attempts to communicate with the origin server (i) to establish a connection and initiate a data transfer between the server in the edge region and the server in the gateway region; (ii) to send the server in the gateway region a SYN over a first TCP connection; (iii) to fake receipt of a dummy SYN/ACK for the first TCP connection following sending of the SYN; (iv) to send one or more data packets to the server in the gateway region before a real SYN/ACK is received; and (v) to receive the real SYN/ACK.

2. The apparatus article as described in claim 1, wherein the first program code generates an ACK packet after faking receipt of the dummy SYN/ACK.

3. The apparatus article as described in claim 1, wherein the one or more data packets are received by the server in the gateway region before the real SYN/ACK is received at the server in the edge region.

4. The apparatus article as described in claim 1, wherein the first program code also processes the real SYN/ACK.

5. The article as described in claim 1, wherein the computer product further comprises:

second program code executed by a second hardware processor as the client attempts to communicate with the origin server (i) to establish a second TCP connection, the second TCP connection directed back to the server in the edge region; (ii) to generate the real SYN/ACK; (iii) to send the SYN/ACK back to the server in the edge region; and (iv) to receive the one or more data packets;

the second hardware processor being associated with the server in a gateway region.

6. The article as described in claim 1, wherein the dummy SYN/ACK comprises a random initial sequence number, an ACK that is a suggested initial sequence number, and values of one or more TCP OPTIONS.

7. The article as described in claim 6, wherein the computer product further comprises:

additional program code executed by the first hardware processor prior to receipt of the real SYN/ACK to construct one or more outgoing data packets, wherein an outgoing data packet has the random initial sequence number, the suggested initial sequence number, and the values of the one or more TCP OPTIONS.

8. The article as described in claim 7, wherein the one or more TCP OPTIONS comprise one of: an MSS value, a window scale factor, and an indication whether SACK is permitted.

* * * * *